3,294,569
LUMINESCENT SCREENS UTILIZING NON-LUMINESCENT SEPARATOR LAYERS

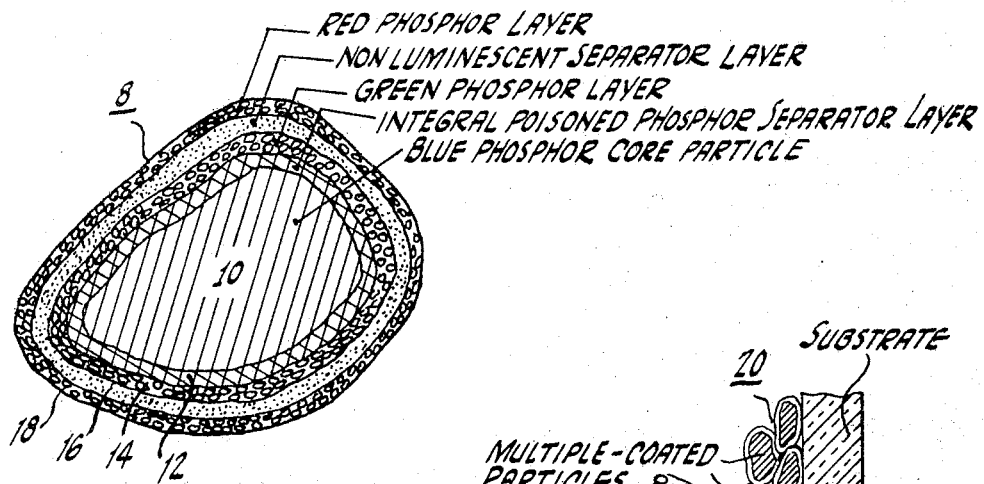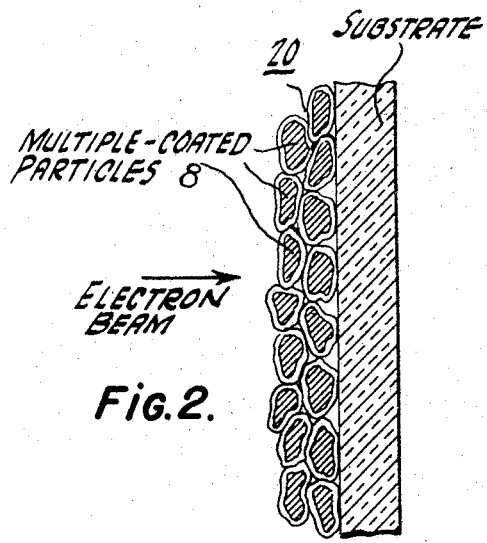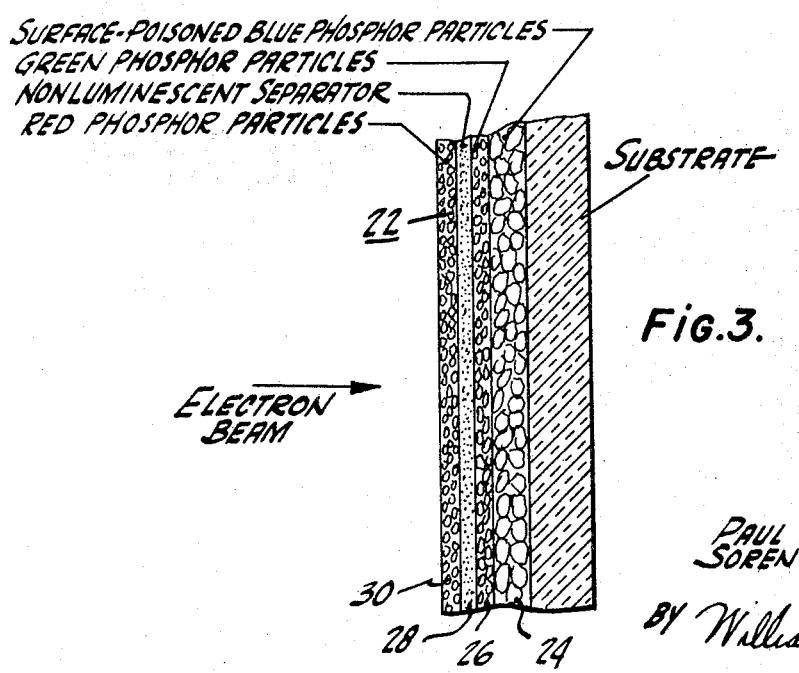

Paul J. Messineo, Skillman, and Soren Milton Thomsen, Pennington, N.J., assignors to Radio Corporation of America, a corporation of Delaware
Filed Dec. 12, 1962, Ser. No. 244,291
2 Claims. (Cl. 117—33.5)

This invention relates, generally, to luminescent screens for cathode ray tubes and to methods of making luminescent screens. The invention is particularly directed to luminescent screens comprising a plurality of superimposed phosphor layers.

One type of cathode ray tube uses a luminescent screen composed of superimposed layers of different phosphors, each of which emits light of a different color, and between which phosphor layers are interposed nonluminescent separator layers. In the operation of such a tube, differential penetration of electrons into the screen is obtained either by varying the velocity of a single electron beam, or by using a plurality of beams of different velocity, to selectively excite the various phosphor layers to produce color images. The nonluminescent separator layers serve, among other things, to improve color purity of the light output.

Each of the superimposed phosphor and nonluminescent separator layers for such a tube should be of uniform thickness and relatively nonporous in the sense that they should be substantially free of interstices, holes therethrough, or cavities therein. Where interstices, holes, or cavities do exist, or where a layer has thin spot, some electrons of the beam may pass through one phosphor layer and a separator layer and excite the next phosphor layer when, in fact, this should not occur. A reduction in color purity accordingly results.

It is therefore an object of this invention to provide a new and improved plural layer screen structure and method of making it.

It is also an object of this invention to provide a plural layer screen structure and method of making it, wherein said screen includes a nonluminescent separator layer of improved density and uniformity.

In accordance with this invention, there is provided a luminescent screen which comprises superimposed layers of a first phosphor material, a nonluminescent separator material, and a second phosphor material. The nonluminescent separator material comprises an integral surface layer or skin portion of one of the phosphor materials, which skin has been treated, e.g. by poisoning, to render it nonluminescent.

This invention may, for example, be embodied in various forms, for example: (1) extended layer form, or (2) multiple coated particle form. In extended layer screens, each of the superimposed phosphor layers extends completely over that portion of the substrate on which the screen is disposed. In screens of multiple coated particles, the superimposed phosphor layers are provided as separate coatings on each of a multiplicity of relatively large particles, of, for example, other phosphor material or glass, which particles are subsequently deposited in a layer on a substrate.

As used herein, "nonluminescent" is a relative term defined by subjective comparison with materials having useful luminescence capability. A nonluminescent material, as used herein, need only be sufficiently low in luminescence capability as to adequately serve the intended function of a separator layer in a plural layer luminescent screen. For this reason, there need not be an abrupt change of luminescence in the form of a distinct boundary between luminescent and nonluminescent layers in devices herein described as incorporating this invention. The boundary may comprise a gradient of luminescence capability in a thickness dimension which gradually changes from complete luminescence to effectively nonluminescence.

In the drawings:

FIG. 1 is a partial section view of a multiple coated particle suitable for making luminescent screens in accordance with the invention;

FIG. 2 is a partial section view of a luminescent screen made with the multiple coated particles of FIG. 1; and FIG. 3 is a partial section view of an extended layer screen made in accordance with the invention.

By way of example, this invention is described with reference to FIGS. 1–3 as embodied in luminescent screens which include three different phosphors, for example, red-emitting, green-emitting, and blue-emitting. However, the invention may instead be embodied in screens having a different number of different phosphors or of phosphors having different color emission characteristics. For example, the invention may be embodied in a two-phosphor screen having orange and cyan emissions.

In FIG. 1 a multiple-coated particle 8 is shown which includes a core 10 of a first phosphor, e.g., blue-emitting. Superimposed on the blue-emitting phosphor core 10, in the order named, are coatings of a first nonluminescent separator layer 12; a layer 14 of a second phosphor, e.g., green-emitting; a second nonluminescent separator layer 16; and a layer 18 of a third phosphor, e.g., red-emitting.

The first nonluminescent separator layer 12 is provided as a poisoned surface layer or skin portion of the blue phosphor core 10, and is accordingly integral therewith, i.e. the layer 12 constitutes a portion of the same single crystal which also constitutes the blue phosphor core 10. The layer 12 is accordingly substantially void of interstices, holes, etc. which might otherwise reduce its quality.

The green phosphor layer 14, the second nonluminescent separator layer 16, and the red phosphor layer 18 may comprise thin layers of, for example, evaporated material or very small particles.

FIG. 2 illustrates a luminescent screen 20 which comprises a layer of the multiple coated particles 8 of FIG. 1. The layer of the multiple coated particles 8 is such that a sufficient number of the particles is provided to completely cover the substrate so as to avoid holes or openings completely through the layer, through which an exciting electron beam could pass.

In preparing the screen 20 of multiple coated particles 8, the multiple coated particles themselves are first prepared. To do this, a suitable quantity of core particles of a first phosphor are first treated, such as by a process hereinafter described, to poison and thereby render relatively nonluminescent an integral surface layer or skin portion of the core particles. Next, superimposed layers of desired thickness of a second phosphor, then a nonluminescent separator material, and thereafter a third phosphor, are coated successively onto the core particles 10. Application of the second and third phosphor layers 14 and 18 and the second separator layer 16 may be provided by, for example, an adsorption process, hereinafter described, or by evaporation of the material in question onto the core particle 10. After the multiple coated particles have been prepared, they are deposited onto a suitable substrate by any one of a number of suitable methods such as settling, slurrying, dusting, or adsorption deposition.

If desired, a suitable metal backing layer (not shown) such as aluminum may then be applied to the layer 20 of multiple coated particles 8 by a process known in the art.

In FIG. 3 an extended layer screen 22 is illustrated which comprises continuous layers of phosphors and separator materials which extend over the entire screened area of the substrate on which the screen is disposed. With respect to the composition and order of the layers, the screen 22 is similar to the multiple coated particle 8 of FIG. 1. A base layer 24 of surface poisoned first phosphor particles may comprise particles identical to the core 10 and poisoned skin layer 12 portions of the multiple coated particle 8 shown in FIGURE 1. Superimposed on the layer 24 of surface-poisoned first phosphor particles are, in the order named, a layer 26 of a second phosphor, a second nonluminescent separator layer 28, and a layer 30 of a third phosphor. The layers 26, 28 and 30 of screen 22 may be identical to the layers 14, 16, and 18 of the multiple coated particle 8 shown in FIGURE 1, except that they extend completely across the area of the screen rather than being separate coatings on individual ones of the surface-poisoned first phosphor particles.

In preparing the screen 22, the first phosphor particles of the layer 24 are preferably first surface-poisoned as in preparation of the multiple coated particles 8. These surface-poisoned particles are then deposited in a layer on a suitable substrate such as by settling, slurrying, dusting, or adsorption deposition. Alternatively, the phosphor particles forming the layer 24 may first be deposited on the substrate and then surface-poisoned. The second and third phosphor layers 26 and 30, and the second nonluminescent separator layer 28 are superimposed on the surface-poisoned particles of the base layer 24 in their appropriate order, such as by settling, slurrying, dusting, evaporating or adsorption deposition.

If desired, a suitable metal backing layer (not shown), such as aluminum, may be applied over the third phosphor layer 30 by a process known in the art.

The provision of phosphor layers by settling, as referred to above, involves the settling of sedimentary size particles through a liquid cushion and onto a substrate. The cushion may comprise an aqueous solution of a suitable binder and electrolyte, as known in the art. Slurrying involves the spreading of a somewhat creamy liquid suspension of particles over a substrate. Dusting involves the sprinkling of dry particles onto a substrate which has been made tacky with a coating of a suitable material. Evaporation involves heating of the selected material, usually in a vacuum, to vaporize it and then collect the vapors thereof in a solidified mass on the substrate. Each of these deposition methods are well known in the art and will not be further described herein.

The adsorption deposition method, referred to above, constitutes a preferred method of depositing the second and third phosphor layers, and the second nonluminescent separator layer onto the poisoned surface of the first phosphor particles. This method is particularly suitable for deposition of very small particles, e.g., submicron in size, and especially for making the multiple coated particles 8.

In accordance with adsorption deposition techniques, a suitable substrate is first covered with a thin adsorptive film of an organic colloid such as gelatin or polyvinyl alcohol. Suitable films can be applied to the substrate by washing the substrate with an aqueous solution of the selected organic colloid. For example, an aqueous gelatin solution of from 0.01 to 10.0% gelatin by weight adjusted to a pH of approximately 4 with acetic acid has been found suitable.

After the adsorptive film has been applied to the substrate, the substrate is thoroughly washed with water to remove any non-adherent organic colloid. The filmed substrate is then washed with a liquid dispersion of the particles which are to be deposited onto the substrate. Such washing results in particles from the dispersion being collected by the adsorptive film into a thin layer onto the substrate. After such time that particles are no longer being deposited from the dispersion onto the adsorptive film at a significant rate, the excess dispersion is removed. The phosphor coated substrate is then again thoroughly washed to remove any nonadherent organic colloid. The steps of coating with an adsorptive film, washing with water, washing with a dispersion of the desired particles, and washing with water may then be repeated as many times as desired to build up a layer of particles to any desired thickness. Layers so provided have been found to be relatively free of gross interstices, openings, cavities, and the like, which would adversely affect the quality of the layer when it is used as a part of a luminescent screen in a penetration type cathode ray tube.

This invention is not limited to any particular type or kind of phosphor, separator material, or poisoning agent. Any of the known phosphors from families such as the sulfides, oxides, selenides, phosphates, or silicates of metals such as zinc, cadmium, manganese, magnesium or calcium may be employed. Such materials may be activated by any of the known suitable activators such as silver, manganese, or copper.

Suitable nonluminescent separator materials include, for example, silica, titanium dioxide, mica, bentonite, talc, vanadium oxide and many other materials which are nonluminescent, are compatible with a suitable method of deposition, and are capable of forming relatively compact, uniform layers.

The poisoning agent may be any material which will act to poison the particular phosphor being used and will not otherwise adversely affect the cathode ray tube into which the screen is incorporated. Suitable poisoning agents include metals such as iron, cobalt, and nickel. These agents may be provided in the form of salts thereof such as sulfates, chlorides, or nitrates.

Treatment of the selected phosphor to provide it with a poisoned skin layer involves washing the phosphor with, for example, an aqueous salt solution of a suitable poisoning agent. The phosphor material so washed, is then dried and fired in a nonoxidizing atmosphere to diffuse the ions of the poisoning agent thereinto. The concentration of the poisoning agent is not critical. Consideration need be given only to depositing a suitable quantity of the poisoning agent on the phosphor to produce the desired depth of poisoning. The concentration to be used may depend, upon other things, the manner in which it is applied to the phosphor, for example, whether the phosphor is washed with an excess of the poisoning solution, or whether the poisoning agent is precipitated upon the phosphor. On the other hand, the temperature at which the phosphor is fired and the time duration of the firing affect the depth to which the phosphor particles are poisoned. The greater the firing temperature or longer the firing time, the greater depth to which the poisoned surface layer will extend.

*Example #1.—Poisoning procedure*

A 100 gram quantity of blue-emitting silver-activated zinc sulfide phosphor is placed together with 500 milliliters of deminaralized water into a blender and agitated for 10 minutes to insure deaggregation of the phosphor. During the agitation of the phosphor suspension, 1.5 milliliters of 0.10 molar cobalt sulfate poisoning agent is added dropwise thereto. Then 1.5 milliliters of 0.5 molar aqueous ammonium sulfide is added dropwise to the suspension to precipitate the cobalt onto the phosphor. After the agitation is completed, the phosphor is allowed to settle from the suspension and the supernatant liquid is decanted and discarded. The phosphor is then washed three times with acetone to remove any excess cobalt ions not firmly adhered to the phosphor particles. The phosphor is then dried and sieved through a 325 mesh sieve. That portion of the phosphor which passes through the sieve is fired in 10 gram lots in nitrogen, for 10 minutes, at a temperature selected to produce the desired thickness of surface poisoned non-luminescent separator layer 12, according to the following table:

| Poisoned depth, $\mu$ | Poisoned depth, mg./cm.$^2$ | Temperature, °C. |
|---|---|---|
| 0.25 | .10 | 760 |
| 0.50 | .20 | 810 |
| 0.75 | .30 | 860 |

In practicing the phosphor poisoning procedure, as described in this example, the following relationship appears to exist: thickness of poisoned layer=(firing temperature °C. −710) (0.005). Longer firing times may be used if desired. If the phosphor is fired for 20 minutes, a specified thickness of the poisoned layer is achieved at about 20° C. lower firing temperature than that given in the firing table for a 10 minute firing.

*Example #2.—Poisoning procedure*

A one kilogram quantity of blue-emitting, silver-activated, zinc sulfide phosphor is covered with an aqueous solution of 0.005 molar cobalt sulfate and agitated for a few minutes at low speed in a blender. The excess cobalt sulfate solution is decanted and the remaining phosphor is washed three times with acetone by decantation. The phosphor is then dried and sieved without force through a 325 mesh sieve.

Firing of the sieved phosphor is carried out as described in Example 1.

*Example #3.—Poisoning procedure*

A 1000 gram quantity of blue-emitting silver-activated zinc sulfide phosphor is added to 800 milliliters of demineralized water. To this suspension, 10 milliliters of 0.5 molar cobalt sulfate poisoning agent is added. The suspension is then agitated gently for about 15 minutes by rolling in a gallon size jar.

The phosphor is then allowed to settle out of the suspension and the supernatant liquid decanted. The last few drops of the supernatant liquid is removed with a siphon or other suitable means. The remaining phosphor material is washed three times with copper-free acetone to remove the non-adherent cobalt ions therefrom. The phosphor is then dried and gently sieved through a 200 mesh sieve. That portion of the phosphor which passes through the sieve is then packed into a carbon crucible containing a quartz tube vertically centered and is covered with a carbon lid. The crucible is then inserted into an inverted quartz vessel and then set on a quartz cover. The phosphor is then fired at 800° C. for a selected period of time, according to the following table:

Poisoned depth mg./cm.$^2$:     Firing time, minutes
  0.063 ------------------------------------- 15
  0.19 -------------------------------------- 29
  0.36 -------------------------------------- 35
  0.39 -------------------------------------- 50

After firing of the phosphor is completed, the phosphor is again gently sieved through the 200 mesh sieve.

In either Examples 1, 2, or 3, after the first phosphor particles have been surface poisoned, as described, they are then given the desired additional phosphor and non-luminescent separator coatings as hereinbefore described.

What is claimed is:

1. A luminescent screen comprising a substrate coated with a layer of phosphor particles, each of said particles comprised of:
 (a) a core of a first phosphor having a surface skin layer thereof poisoned to provide a non-luminescent separator layer surrounding said core,
 (b) and a second and different phosphor layer surrounding said separator layer.

2. A luminescent screen comprising a substrate coated with a layer of phosphor particles, each of said particles comprised of:
 (a) a core of a first phosphor having a surface skin layer thereof poisoned to provide a first nonluminescent separator layer surrounding said core,
 (b) a second and different phosphor layer surrounding said first separator layer,
 (c) a second non-luminescent separator layer surrounding said second phosphor layer, and
 (d) a third and different phosphor layer surrounding said second nonluminescent layer.

References Cited by the Examiner

UNITED STATES PATENTS

| 2,487,097 | 11/1949 | Byler | 117—33.5 |
| 2,634,217 | 4/1953 | Sanabria et al. | 117—33.5 |
| 2,958,002 | 10/1960 | Cusano et al. | 117—33.5 |
| 2,996,380 | 8/1961 | Evans | 117—33.5 |
| 3,017,288 | 1/1962 | Windsor | 117—33.5 |
| 3,095,317 | 6/1963 | Saffire | 117—33.5 |

WILLIAM D. MARTIN, *Primary Examiner.*

S. W. ROTHSTEIN, *Assistant Examiner.*